July 1, 1930.  G. A. ISENMAN  1,769,293
WAXING AND POLISHING MACHINE
Filed Oct. 1, 1927
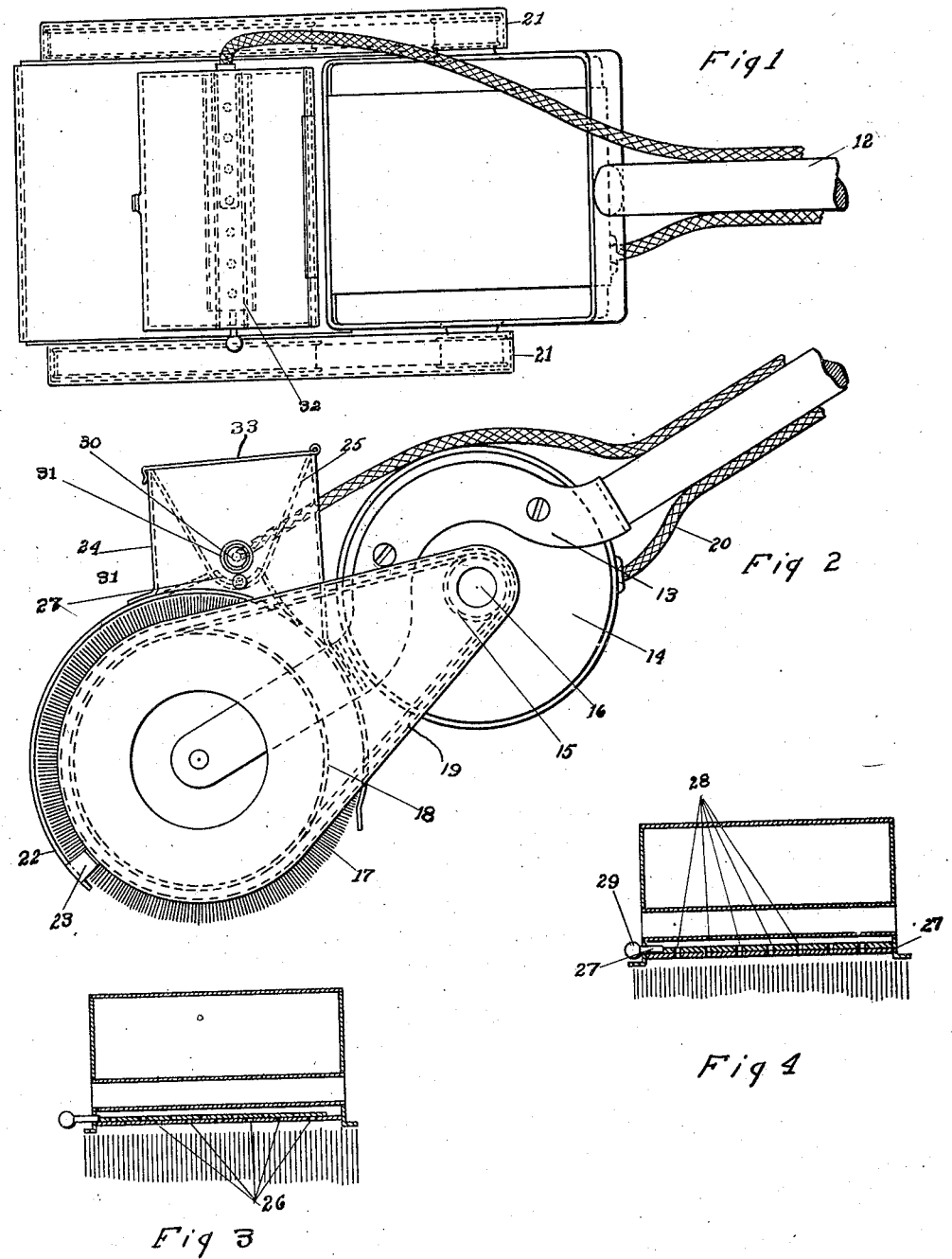
INVENTOR
George A. Isenman
by Samuel Siegel
ATTORNEY Patented July 1, 1930

1,769,293

UNITED STATES PATENT OFFICE

GEORGE A. ISENMAN, OF MALDEN, MASSACHUSETTS, ASSIGNOR TO AUTOMATIC FLOOR WAXING MACHINE CORPORATION, OF MALDEN, MASSACHUSETTS, A CORPORATION OF MASSACHUSETTS

WAXING AND POLISHING MACHINE

Application filed October 1, 1927. Serial No. 223,293.

My invention relates to waxing and polishing machines.

The object of my invention is to provide a machine that will automatically wax the floors and will then polish the floors after the waxing has been stopped.

Another object of my invention is to provide a machine which has a container for wax attached thereto, and means to feed the wax to a brush, and means to keep the wax at a certain temperature during the operation of waxing.

The invention will be hereinafter considered in detail and specifically claimed. Reference will now be had to the drawing forming a part of this application, wherein there is illustrated a preferred embodiment of my invention, but it is understood that the elements thereof can be varied or changed as for shape, size, or form, and various modifications thereof in detail and in the arrangement of the parts may be made by those skilled in the art, without departing from the spirit of the invention.

Fig. 1 is a plan view of the machine.
Fig. 2 is a side view of the machine.
Fig. 3 is an enlarged sectional view of the wax container, showing means by which the flow of wax will be stopped.
Fig. 4 shows the position of the openings in the bottom of the container when wax is being fed to the brush.

In the drawings:—

12 represents a handle which has two arms 13 at its end. A motor 14 of the proper amperage and voltage is solidly connected to the upper part of the arms 13. Said motor is provided with pulleys 15 on both of its ends, which are mounted on its axes 16. A circular brush 17 is rotatably connected to the lower part of the arms 13. The brush 17 is provided with pulleys 18 on both of its ends. The brush is driven by belts 19 which are operated by pulleys 15 and 18. The motor is operated by an electrical current from the wires 20 in the usual manner. The belts and pulleys are enclosed in casings 21.

Solidly connected to the casings 21 there is a frame consisting of a circular flat piece of metal 22 which is solidly attached to the casings 21 by means of lugs 23. This plate 22 acts as means to distribute the wax over the surface of the brush 17. To this flat piece of metal 22 there is connected a rectangular frame 24 open at its bottom. A rectangular piece of metal bent in a trough like form 25 fits tightly into the said frame 24. The trough 25 has openings 26 therein at its bottom, extending along the width of the brush. A somewhat rounded piece of metal 27 with openings 28 therein, which openings correspond in size and in location to the openings 26, is placed directly over the bottom of the trough. The rounded piece of metal 27 is provided with a handle 29, which handle extends through the frame 24, and it is so arranged that this part 27 may be so moved that the openings therein will be in and out of alignment with the openings 26 of the trough 25, so that the flow of wax through the openings 26 and on to the brush may be controlled by the said handle. The frame 24 is provided near the bottom of the trough with a round opening 30, into which a circular pipe 31 fits. An electrical heating unit 32 of the usual construction fits into the said circular pipe 31. The frame 24 is provided with a hinged cover 33 for the purpose of covering the trough.

The operation of my machine will now be described.

When it is desired to wax and polish a floor, the heating unit is inserted into the circular opening provided therefor, and the handle 29 is so manipulated that the openings 26 and 28 are in alignment with each other. The current to operate the motor and the current to heat the electrical heating unit is then turned on. The wax will melt and will pass through the openings 26 and 28 and will fall on to the brush 17. This operation will apply wax to the floor uniformly and evenly. When it is desired to stop the flow of the wax and to polish the surface of the floor by means of the brush alone, then the heating unit is disconnected and the handle 29 so manipulated that the openings 26 are out of alignment with the openings 28, so that no more wax can flow on to the brush, and then the brush is used for purposes of polishing the floor.

From the above description, it will be seen that I have provided a simple mechanism which will be able to be used as a waxing machine, and by simple manipulation, it will be able to be used as a polishing machine.

Having described my invention, what I claim is:

1. A waxing and polishing machine consisting of a brush, a frame mounted over said brush, a wax container located in said frame and provided with openings along its bottom, an arcuate plate positioned on the inside bottom of said container and having a plurality of openings therein, and a handle, operable externally of the machine to move said arcuate plate and aline the openings therein with the openings in the container, whereby the wax will flow onto the brush, and a heating element located on the interior of said container in close relation to said arcuate plate.

2. A waxing and polishing machine consisting of a brush, a frame mounted over said brush, a wax container located in said frame and provided with openings, an arcuate plate positioned on the inside bottom of said container and having a plurality of openings therein, a heating unit in said container in close relation to said arcuate plate and extending substantially the length thereof, a handle operable externally of the machine to move said arcuate plate and aline the openings therein with the openings in the container, whereby the wax will flow onto the brush, and means to distribute the said wax over a predetermined portion of the surface of said brush.

3. A waxing and polishing machine consisting of a brush, a frame mounted over said brush, a wax container located in said frame and provided with openings, an arcuate plate postioned on the inside bottom of said container and having a plurality of openings therein, a handle operable externally of the machine to move said arcuate plate and aline the openings therein with the openings in the container, whereby the wax will flow onto the brush, and an arcuate plate extending around a portion of said brush and adapted to distribute said wax over a predetermined portion of the surface of said brush, said frame being mounted directly on said second arcuate plate.

4. A waxing and polishing machine consisting of a brush, a frame mounted over said brush, a wax container located in said frame and provided with openings, an arcuate plate positioned on the inside bottom of said container and having a plurality of openings therein, a heating unit in said container in close relation to said arcuate plate and extending substantially the length thereof, a handle operable externally of the machine to move said arcuate plate and aline the openings therein with the openings in the container, whereby the wax will flow onto the brush, and a second arcuate plate extending around a portion of said brush and adapted to distribute said wax over a predetermined portion of the surface of said brush, said frame being mounted directly on said second arcuate plate.

GEORGE A. ISENMAN.